UNITED STATES PATENT OFFICE.

DANL. E. SOMES, OF WASHINGTON, DISTRICT OF COLUMBIA.

IMPROVEMENT IN REFRIGERATORS FOR PRESERVING ARTICLES OF FOOD.

Specification forming part of Letters Patent No. 46,277, dated February 7, 1865.

*To all whom it may concern:*

Be it known that I, DANIEL E. SOMES, of Washington, in the District of Columbia, have invented a new and useful Improvement in Refrigerators for the Preservation of Articles of Food; and I do hereby declare the following to be a full and exact description of the same.

The object of my invention is to construct a refrigerator of any size that may have in its interior a temperature sufficiently cold to prevent decay in animal or vegetable substances. To accomplish this object I construct my refrigerator with a series of walls, floors, and roofs, with chambers between. The walls separating these chambers may be of wood, metal, or other suitable material, or one or more may be of cork or glass. The interior chamber, and one or more of the others, if desired, I fill with salt and ice or any other cold mixture or substance that may produce the desired effect. The object of one or more of these dividing-walls being of cork or glass, as stated, is that these substances, being non-conductors of electricity, and being interposed between the interior containing the articles for preservation and the chamber for the cooling substance, prevent the influence of the electricity in the outer atmosphere from affecting articles designed to be preserved. I may also, if desirable, place walls of cork or glass between the chamber of the cold substance and the air-chambers.

I construct the top or roof of the refrigerator in such a manner that the ice or cooling substance may be easily introduced. The large chamber above, in which this substance is placed, communicates with the interior chamber of the walls and floor, so that the cold substance fills all the space surrounding the interior of the refrigerator. The advantage of this method over the one generally in use of placing the ice in the same compartment with the substances designed to be kept cool is that the interior of the refrigerator is kept free from water, dampness, and vapor produced by melting ice, and that a better condition is thus secured for the preservation of any animal or vegetable substance.

To increase the coolness and secure ventilation in the interior of the refrigerator, I place a pipe, (or more than one, if desirable,) the upper end opening in the air outside and opened and closed by a stop-cock, and the lower end communicating with the interior of the compartment either from above or by being carried between two of the walls, down the side, and opening into the interior near the floor. This pipe may be of the same size throughout, or, as is preferable, the lower end may be larger than the upper. The pipe being surrounded by the cold substance before mentioned, the air entering at the upper end becomes cold, and, being made heavier thereby, falls by its own weight to the bottom and enters the interior of the refrigerator.

For carrying off the heated and impure air and gases which may be thrown off by the substances in the interior of the refrigerator, I place one or more tubes or pipes running from the interior to the outer atmosphere and also regulated by stop-cocks, the lower end of the latter pipe being above that of the former. I thus secure a circulation of pure air in the interior without raising the temperature.

I may construct the interior of my refrigerator so as to have but one compartment, in the same manner as is usual, or, which I consider preferable, may divide the interior into several different and separate compartments. In the latter case I so construct the separate compartments that each shall be separate from the others and air-tight. I may or may not so arrange the interior that the cooling substance may pass around each compartment to increase the surface on which the cold acts; but in refrigerators of sufficient size I consider it preferable to do so. I provide each compartment with a door or drawer, and to render them air-tight when closed I fasten to the door and door-joint, or to either, strips of any elastic substance when made hollow—such as vulcanized rubber tubing or its equivalent—so that when the door or drawer is closed the pressure against this yielding substance may preclude the entrance of air. The advantages of this plan of separate compartments are that different articles may be kept apart and not receive any taint or flavor from each other, and that access may be had to one or more articles in the refrigerator without the admission of warm air to others that it is desirable to keep undisturbed.

I apply the same principles and method of construction here described to cars, vehicles, and vessels for the preservation of animal and vegetable substances while being transported.

I do not confine myself to the use of either liquid or solid materials to render the chambers of the sides and floor cold, but may simply place ice in the large chamber above the interior and cool the chambers by the cool air from the ice.

What I claim as new and of my invention, and desire to secure by Letters Patent, is—

1. A refrigerator with multiple walls and so constructed that the interior shall be separated from the cooling substance, thereby excluding dampness.

2. The use of cork for the walls, in the manner and for the purpose set forth.

3. The use of glass for the walls, as and for the purpose shown.

4. The pipe larger at the bottom than top, substantially as described.

5. The air-tight compartments, substantially as and for the purpose shown.

6. The vulcanized-rubber tubing or its equivalent, when used in the manner set forth.

7. The vulcanized-rubber tubing, when applied to any door or drawer for a similar purpose.

D. E. SOMES.

Witnesses:
   FRED B. GINN,
   J. C. SMITH.